United States Patent [19]

Fischer et al.

[11] Patent Number: 4,847,348

[45] Date of Patent: Jul. 11, 1989

[54] IMIDE MODIFIED EPOXY RESINS

[75] Inventors: Gordon C. Fischer, Angleton; Linda M. McKinney, Lake Jackson, both of Tex.

[73] Assignee: The Dow Chemical Company, Midland, Mich.

[21] Appl. No.: 203,353

[22] Filed: Jun. 6, 1988

Related U.S. Application Data

[63] Continuation-in-part of Ser. No. 74,128, Jul. 17, 1987, abandoned.

[51] Int. Cl.$^4$ .............................................. C08G 59/40
[52] U.S. Cl. .................................... 528/117; 525/113; 525/438; 525/504; 525/509; 525/511; 525/514; 525/530; 525/533
[58] Field of Search ................ 528/117; 525/533, 504, 525/530, 509, 511, 514, 113, 438

[56] References Cited

U.S. PATENT DOCUMENTS 3,962,182  6/1976  Steele .................................. 528/117
4,552,935  11/1985  Haug et al. .......................... 525/480

OTHER PUBLICATIONS

"Study of Chemical Process of Modification of Epoxy Oligomers by Imides in Dipolar Solvents", M. F. Sorokin et al., *Mosk. Klim.-Teknol. Inst. im. D. I. Mendeleeva*, 1980, 110, pp. 119–123, (CA, 96:123831m).
CA, 97:24674b, (Czech. CS 193,294).
CA, 86:31089r, (Span. 409,632).
CA, 86:74567m, 86:74568p, 86:91942y, 86:91943z, 86:91944a, and 86:91946b, (Japan Kokai 76/130,430, 76/131,530, 76/131,535, 76/131,529, 76/131,527 and 76/131,526).

*Primary Examiner*—John Kight
*Assistant Examiner*—Frederick Krass

[57] ABSTRACT

Epoxy resins having low melt viscosities and high softening points are prepared by partially reacting the epoxy resin with a monoimide. These modified epoxy resins are useful as binders in preparing high flow-out, non-sintering powder paints, particularly in epoxy resin/polyester hybrid coatings.

29 Claims, No Drawings

IMIDE MODIFIED EPOXY RESINS

CROSS REFERENCE TO RELATED APPLICATION

This application is a continuation-in-part of application Ser. No. 074,128 filed July 17, 1987, now abandoned which is incorporated herein by reference to its entirety.

FIELD OF THE INVENTION

The present invention pertains to modified epoxy resins and their use in coating compositions.

BACKGROUND OF THE INVENTION

Powder coatings are increasingly becoming an important segment of the coatings industry. They offer a wide range of advantages over conventional solvent borne coatings, such as the absence of volatile organic compounds, 95-98% recovery of over-sprayed powder, superior corrosion and chemical resistance, and the like. One major disadvantage, however, particularly for polyester/epoxy hybrid decorative coatings, is their lack of flow-out during cure and the resulting uneven or "orange-peel" appearance. This poor appearance is caused predominantly by the high melt viscosity of the solid carboxy functional polyester resin and the unsatisfactorily high melt viscosity of the solid epoxy resin used to cure the polyester resin. There are several solid epoxy resins based upon bisphenol A which have low melt viscosities, such as D.E.R. TM 661 and D.E.R. TM 662 solid epoxy resins available from The Dow Chemical Company and EPON TM 1001 and EPON TM 1002 solid epoxy resins available from Shell Chemical Company. Solid epoxy resins are typically available for powder coatings as a finely divided solid flake, chip or granule. These resins can conceivably be used for powder coatings to provide smooth finishes. However, because of their low softening points, they are found to not be stable upon prolonged periods of storage at ambient temperatures. If stored for long periods of time, the resin flakes, chips or granules tend to clump together (sinter) rendering them unusable until mechanically broken apart. Because of the inherent storage problem associated with low melt viscosity epoxy resins, it would be desirable to have available epoxy resins which not only have very low melt viscosities, but also have adequate physical storage stability as evidenced by their high softening points. These resins would advantageously provide high flow-out and consequently impart very smooth finishes without the need for special resin storage facilities. The coatings industry considers standard epoxy resins which have Mettler softening points of about 90° C. and above to be storage stable whereas those have Mettler softening points below about 85° C. require refrigerated storage. Those standard resins having Mettler softening points between 85° C. and 90° C. may or may not require special storage facilities.

It would be desirable to have available solid epoxy resins which have physical storage stability (a Mettler softening point of at least 85° C.) while possessing a relatively low melt viscosity.

SUMMARY OF THE INVENTION

The present invention pertains to a modified, solid epoxy resin having a Mettler softening point of at least about 85° C. resulting from reacting a solid epoxy resin having an average of more than one vicinal epoxide group per molecule with a monoimide of a dicarboxylic acid which is essentially free of allyl and methallyl groups in an amount sufficient to raise the Mettler softening point to at least 85° C. when the resin before modification has a Mettler softening point below 85° C. or when the softening point of the unmodified resin is above 85° C., an amount sufficient to raise the softening point by at least about 2° C.

The present invention also pertains to curable compositions containing the aforementioned monoimide modified epoxy resins and a curing quantity of a curing agent therefor.

The present invention also pertains to coating compositions containing the aforementioned monoimide modified epoxy resins.

The present invention therefore provides for solid epoxy resins which exhibit an improvement in physical storage stabilty without a significant increase in melt viscosity.

DETAILED DESCRIPTION OF THE INVENTION

If desired, these resins can conveniently be prepared by reacting a relatively low molecular weight epoxy resin with an organic compound having an average of about 2 aromatic hydroxyl groups per molecule, hereafter referred to as a dihydric phenol, in the presence of a suitable advancement catalyst at temperatures of from about 50° C. to about 250° C., suitably from about 100° C. to about 200° C., more suitably from about 150° C. to about 175° C. for a period of time to essentially complete the advancement reaction, suitably from about 1 to about 24, more suitably from about 2 to about 6, most suitably from about 3 to about 4 hours. The epoxy resin and the organic compound having an average of about 2 aromatic hydroxyl groups per molecule are reacted in amounts which provide a ratio of aromatic hydroxyl groups to epoxy groups of from about 0.1:1 to about 0.9:1, suitably from about 0.3:1 to about 0.7:1, more suitably from about 0.4:1 to about 0.6:1. The resultant products have Mettler softening points of at least 85° C., preferably at least 90° C.

Any epoxy resin having an average of more than one vicinal epoxy group per molecule which can be reacted with a dihydric phenol to form a solid epoxy resin can be modified as described herein. Particularly suitable are those epoxy resins having the following Formulas I, II, III and IV:

FORMULA I

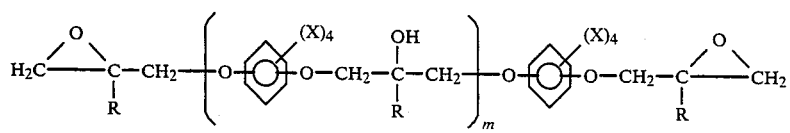

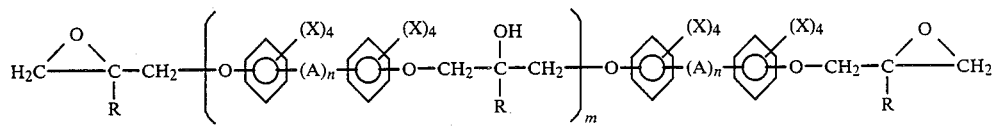

FORMULA II

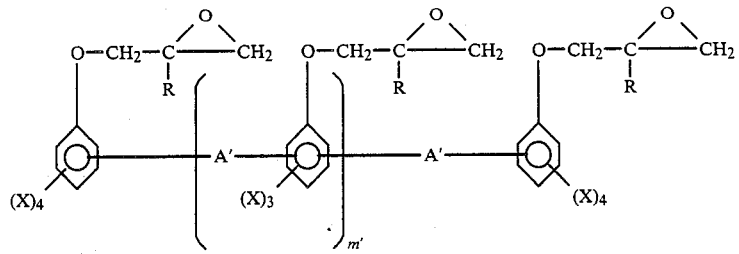

FORMULA III

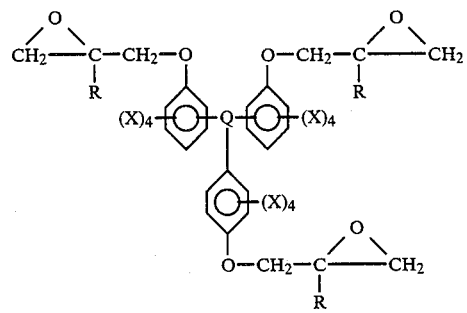

FORMULA IV

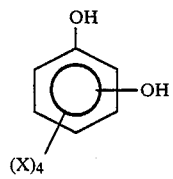

FORMULA V

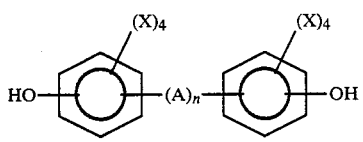

FORMULA VI wherein each A is independently a divalent hydrocarbon group having from 1 to about 10, suitably from 1 to about 6, carbon atoms, —O—, —S—, —S—S—, —SO—, —SO$_2$— or —CO—; Q is a trivalent hydrocarbon group having from 1 to about 10 carbon atoms; each A' is independently a hydrocarbon group having from 1 to about 10, suitably from about 1 to about 4, carbon atoms; each R is independently hydrogen or an alkyl group having from 1 to about 4 carbon atoms; each X is independently hydrogen, a hydrocarbyl or hydrocarbyloxy group having from 1 to about 10, suitably from 1 to about 4 carbon atoms, bromine, chlorine or fluorine; m has an average value of from zero to about 15; m' has an average value from about 0.001 to about 5, suitably from about 0.001 to about 3; and n has a value of zero or 1.

The term hydrocarbyl as employed herein means any aliphatic, cycloaliphatic, aromatic, aryl substituted aliphatic substituted aromatic groups. Likewise, the term hydrocarbyloxy means a hydrocarbyl group having an oxygen linkage between it and the object to which it is attached.

The epoxy resins which can be modified according to the present invention can be purchased commercially from several sources, eg The Dow Chemical Company, Shell Chemical Company or Ciba-Geigy Corp., to name a few.

Suitable dihydric phenols which can be employed herein to prepare solid epoxy resins by reaction with liquid epoxy resins include, for example, those represented by the following formulas V and VI:

wherein each A, X and n is as defined above.

Suitable catalysts for reacting the epoxy resin with the dihydric phenol include any acid or base (Lewis, Bronsted-Lowery type, nitrogen-, phosphorus-, oxygen-, or sulfur-containing bases such as tertiary amines; primary, secondary or tertiary phosphines; metal salts of alcohols, phenols, carboxylic acids or water; thioethers and the like) or any compound which will catalyze the reaction between an epoxy group and a phenolic hydroxyl group such as, for example, imidazoles, tertiary amines, quaternary ammonium compounds, phosphonium compounds, phosphines, combinations thereof and the like. Suitable imidazoles include, for example, 2-methylimidazole, 2-ethyl-4-methylimidazole, 2-ethylimidazole, 1-methylimidazole, 1-propylimidazole, 2-phenylimidazole, combinations thereof and the like. Suitable tertiary amines include, for example, N,N-dimethylbenzylamine, N,N-dimethylaniline, triethylamine, tripropylamine, triphenylamine, combinations thereof and the like. Suitable quaternary ammonium catalysts which can be employed herein include, for example, benzyl trimethyl ammonium chloride, benzyl trimethyl ammonium bromide, tetrabutyl ammonium chloride, combinations thereof and the like. Particularly suitable phosphonium compounds include, for example, ethyltriphenyl phosphonium chloride, ethyltriphenyl phosphonium bromide, ethyltriphenyl phosphonium iodide, ethyltriphenyl phosphonium acetate.acetic acid complex, tetrabutyl phosphonium chloride, tetrabutyl phosphonium bromide, tetrabutyl phosphonium iodide, tetrabutyl phosphonium acetate.acetic acid complex, combinations thereof and the like. Suitable such catalysts which can be employed herein include, for example, those disclosed in U.S. Pat. Nos. 3,306,872; 3,341,580; 3,379,684; 3,477,990; 3,547,881; 3,948,855; 4,048,141; 4,093,650; 4,131,633; 4,132,706; 4,171,420; 4,177,216; 4,302,574; 4,320,222; 4,366,295 and 4,389,520, all of which are incorporated herein by reference.

Instead of preparing the solid epoxy resin for modification as described herein, one can just as well employ commercially available solid epoxy resins as mentioned above. These epoxy resins can have the formulas I and II described above wherein the value of m is from about 2 to about 15, more suitably from about 2 to about 10, most suitably from about 3 to about 6, or formula III where m' has a value of at least 3.

The reaction between the monoimide-containing compound and the solid epoxy resin can be conducted in the presence of a suitable catalyst for reacting an epoxy (oxirane) group with an imide group. The reaction is suitably conducted at a temperature of from about 100° C. to about 250° C., suitably from about 125° C. to about 200° C., more suitably from about 150° C. to about 175° C. for a period of time to essentially complete the addition reaction, suitably from about 0.25 to about 4, more suitably from about 0.25 to about 2, most suitably from about 0.5 to about 1 hour(s). Higher temperatures require less reaction time than do lower temperatures. Temperatures above about 250° C. can result in an undesired reaction between epoxy groups and hydroxyl groups of the modified epoxy resin which can result in an excess molecular weight increase of the polymer.

At temperatures below about 100° C., the reaction is unsatisfactorily slow. In some epoxy resins, the imide may be insoluble at temperatures below about 100° C. and thus will not appreciably react. In addition, at these temperatures, the mixture may be too viscous for effective mixing.

The imide compound is employed in an amount which is sufficient to raise the Mettler Softening point to at least 85° C., or if the softening point is already above 85° C., to raise the Mettler softening point by at least about 2° C. Usually from about 0.5 to about 10, suitably from about 1 to about 8, more suitably from about 2 to about 6, percent of the monoimide compound based on the combined weight of the imide compound and the epoxy resin is sufficient.

Suitable catalysts for effecting the reaction between the epoxy groups of the epoxy resin and an imide group include, for example, those previously described as being suitable for the reaction between an epoxy resin and a phenolic hydroxyl group. Particularly suitable catalysts include, for example, ethyltriphenylphosphonium chloride, ethyltriphenylphosphonium bromide, ethyltriphenylphosphonium iodide, ethyltriphenylphosphonium acetate.acetic acid complex, ethyltriphenylphosphonium phosphate.phosphoric acid complex, tetrabutyl phosphonium chloride, tetrabutyl phosphonium bromide, tetrabutyl phosphonium iodide, tetrabutyl phosphonium acetate.acetic acid complex, tetrabutyl phosphonium phosphate.phosphoric acid complex, and those catalysts disclosed in U.S. Pat. No. 3,962,182 which is incorporated herein by reference.

Suitable monoimide compounds which can be employed herein include, for examle, those represented by the following formula VII

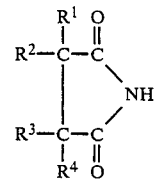

FORMULA VII wherein each $R^1$, $R^3$, $R^4$, is independently hydrogen or a hydrocarbyl group having from 1 to about 20, suitably from 1 to about 10, more suitably from 1 to about 5, carbon atoms or $R^2$ and $R^3$ can be combined to form a saturated or unsaturated cycloaliphatic ring or an aromatic ring or another bond between the carbon atoms to which they are attached.

Particularly suitable monoimide compounds include, for example, maleimide, phthalimide, succinimide, tetrahydrophthalimide, dihydrophthalimide, hexahydrophthalimide, naphthalenedicarboximide, pentanedicarboximide, hexanedicarboximide, 3-methyl-1,2-benzene dicarboximide, 4-methyl-1,2-benzene dicarboximide, 4-phenyl-1,2-benzene dicarboximide, 1,2-cyclobutane-dicarboximide, 1,2-cyclopentanedicarboximide, 1,2-cyclohexanedicarboximide, 1,2-cycloheptanedicarboximide, 3-methyl-1,2-cyclohexyldicarboximide, 3-methyl-azacyclohexane-2,6-dione, 4-methylazacyclohexane-2,6-dione, 3-ethyl-azacyclopentane-2,5-dione, 3-ethyl-4-methyl-azacyclopentane-2,5-dione, 3,4-dimethylazacyclopentene-2,5-dione, combinations thereof and the like.

The modified epoxy resins of the present invention can be cured with any suitable curing agent for epoxy resins including, for example, primary and secondary polyamines, carboxylic acids and anhydrides thereof, phenolic hydroxyl-containing compounds, ethylene-acrylic acid copolymers, ethylene-methacrylic acid copolymers, styrene-acrylic acid copolymers, styrene-methacrylic acid copolymers, polyisocyanates, guanidines, biguanides, urea-aldehyde resins, melaminealdehyde resins, alkoxylated urea-aldehyde resins, alkoxylated melamine-aldehyde resins, polymercaptans, tertiary amines, aromatic polyamines such as methylenedianaline and diaminodiphenylsulfone, sulfanilamides, phosphates and partial esters thereof, phosphites, Lewis acids such as borontrifluoride and complexes thereof, combinations thereof and the like. Particularly suitable curing agents include, for example, dicyandiamide, phenolic compounds such as phenol-formaldehyde novolac resins, cresol-formaldehyde novolac resins, D.E.H. ™ 81, D.E.H. ™ 82, D.E.H. ™ 84 and D.E.H. ™ 85 curing agents available from The Dow Chemical Company, imidazoles such as 2-methylimidazole, 2-phenylimidazole and reaction products of 2-methylimidazole or 2-phenylimidazole with liquid epoxy resins, trimellitic anhydride, pyromellitic dianhydride, phthalic anhydride, maleic anhydride, succinic anhydride, chlorendic anhydride, carboxy functional polyester resins, combinations thereof and the like. The curing agents are employed in an amount which will effectively cure the composition containing the modified epoxy resin. These amounts will depend upon the particular modified epoxy resin and curing agent employed; however, suitable amounts include, for example, from about 0.1 to about 1.5, more suitably from about 0.5 to about 1.25, most suitably from about 0.75 to about 1, equivalent(s) of curing agent per equivalent of epoxy resin.

The modified epoxy resins of the present invention can be blended with other materials such as solvents or diluents, fillers, pigments, dyes, flow modifiers, thickeners, reinforcing agents, leveling agents, extenders, antistatic agents, or other polymers such as unmodified epoxy resins, polyethylene, polystyrene, polypropylene, ethylene-alkyl acrylate copolymers, nylons, polyester resins, poly(vinyl chloride) or poly(vinylidene chloride) resins, combinations thereof and the like.

These additives, when employed are added in functional equivalent amounts eg, the pigments and/or dyes are added in quantities which will provide the composition with the desired color; however, they are suitably employed in amounts of from about 5 to about 70, suitably from about 10 to about 60, more suitably from about 30 to about 50, percent by weight based upon the weight of complete or total coating mixture.

Solvents or diluents which can be employed in coating applications other than powder coatings include, for example, hydrocarbons, ketones, glycol ethers, alcohols, ethers, combinations thereof and the like. Particularly suitable solvents or diluents include, for example, toluene, benzene, xylene, methyl ethyl ketone, methyl isobutyl ketone, diethylene glycol methyl ether, dipropyl glycol methyl ether, methanol, ethanol, propanol, isopropyl alcohol, sec-butyl alcohol, tert-butyl alcohol, ethyl ether, ethyl methyl ether, propyl ether, butyl ether, hexyl ether, combinations thereof and the like.

The modifiers such as thickeners, flow modifiers and the like can be suitably employed in amounts of from about 0.1 to about 5, suitably from about 0.5 to about 3, more suitably from about 0.75 to about 2, percent by weight based upon the weight of the total coating mixture.

The fillers, when employed, can be suitably employed in amounts of from about 5 to about 70, suitably from about 10 to about 60, more suitably from about 30 to about 50, percent by weight based upon the weight of the total coating mixture.

The following examples are illustrative of the invention and are not to be construed as to limiting the scope thereof in any manner.

EXAMPLE 1

In a 2-liter 5-necked round-bottom flask equipped with a mechanical stirrer, thermometer, temperature controlled heating material, nitrogen purge, and reflux condenser, are placed 800.2 g (4.23 epoxide equiv.) of a diglycidyl ether of bisphenol A having an epoxide equivalent weight (EEW) of 189 and 274.3 g of (2.41 hydroxyl equiv.) of Bisphenol A (ER grade). The mixture is heated to 100° C. with stirring under nitrogen atmosphere. The temperature is maintained at 100° C. until dissolution of the Bisphenol A. A catalyst, a 70 weight percent solution of ethyl triphenylphosphonium acetate.acetic acid complex in methanol), 1.0 ml, is then added while maintaining stirring. The temperature controller is set to 150° C. and the voltage applied to the heating mantel is adjusted so that the temperature of the reaction mixture rises at an initial rate of no greater than 1° C.–2° C. per minute. The reaction mixture is allowed to exotherm and then cool to 170° C. (Peak temperature ranges from 170° C.–200° C.). The temperature is maintained at this temperature and a sample of the resin is drawn for EEW and softening point determination. The unmodified resin has an EEW of 580 and a Mettler softening point of 82° C. Phthalimide (5.0 weight %) is then added to the molten resin and a small exothermic reaction occurs which causes the temperature of the reaction mixture to rise, ~10° C. After the exotherm, the reaction mixture is allowed to cool to 170° C. and is held at this temperature for 20–30 minutes and then poured out and allowed to cool to room temperature. The resulting clear, pale yellow resin has an EEW of 772, Mettler softening point of 93.3° C., and a melt viscosity (150° C., Kinematic) of 1435 centistokes.

EXAMPLES 2–13 and COMPARATIVE EXPERIMENTS A–D

Examples 2–13 and Comparative Experiments A–D are prepared in a manner similar to Example 1 using the reagent quantities shown on Table I. The Comparative Experiments do not employ an imide. The resulting resins EEWs, Mettler softening points, and viscosities are also shown in Table I.

TABLE I

| Example No. or Comp. Expt. Letter | Base Resin | | | Modified Resin | | | |
|---|---|---|---|---|---|---|---|
| | DGEBA$^a$ grams | Bis A grams | EEW | % Imide$^b$ | EEW | MSP$^c$ | V$^d$ |
| 1 | 800.2 | 274.3 | 580 | 5.0 | 772 | 93.3 | 1435 |
| Comp. Expt. A* | 800 | 302 | 662 | 0 | 662 | 93.5 | 1764 |
| 2 | 977.3 | 322.7 | 551 | 5.0 | 743 | 92.1 | 1376 |
| Comp. Expt. B* | 744.7 | 255.3 | 566 | 0 | 566 | 81.3 | 868 |
| 3 | 955.7 | 304.3 | 505 | 5.0 | 660 | 87.0 | 833 |
| 4 | 900.0 | 308.5 | 586 | 2.6 | 693 | 92.6 | 1594 |
| Comp. Expt. C* | 723.4 | 276.6 | 695 | 0 | 695 | 92.4 | 2970 |
| 5 | 986.6 | 313.4 | 528 | 5.0 | 708 | 91.0 | 1239 |
| 6 | 908.9 | 311.6 | 596 | 3.8 | 773 | 96.1 | 2170 |
| 7 | 900.0 | 308.5 | 593 | 1.3 | 650 | 90.4 | 1388 |
| 8$^e$ | 986.6 | 313.4 | 546 | 5.0 | 705 | 89.3 | 1144 |
| 9 | 800.2 | 274.3 | 585 | 7.0 | 950 | 99.0 | 2520 |
| 10 | 800.2 | 274.3 | 610 | 3.8 | 773 | 94.6 | 1999 |
| Comp. Expt. D* | 712.8 | 287.2 | 755 | 0 | 755 | 94.7 | 2520 |

TABLE I-continued

| Example No. or Comp. Expt. Letter | Base Resin | | | Modified Resin | | | |
|---|---|---|---|---|---|---|---|
| | DGEBA[a] grams | Bis A grams | EEW | % Imide[b] | EEW | MSP[c] | V[d] |
| 11 | 2213.5 | 703.1 | 521 | 5.0 | 696 | 87.9 | 894 |
| 12 | 2218.4 | 713.8 | 538 | 5.3 | 738 | 89.7 | 1154 |
| 13 | 985.6[f] | 319.3 | 490 | 5.0 | 645 | 87.6 | 943 |

*Not an example of the present invention.
[a]Diglycidyl ether of Bisphenol A having an EEW of 189 (liquid, no Mettler softening point).
[b]Phthalimide.
[c]Mettler softening point.
[d]Kinematic melt viscosity in centistokes measured at 150° C.
[e]Phthalimide added prior to advancement.
[f]Diglycidyl ether of Bisphenol A having an EEW of 183 instead of 189 (liquid, no Mettler softening point).

The data in Table I demonstrates that epoxy resins which have been modified with an imide have desirably reduced melt viscosities as compared to epoxy resins which have not been modified with an imide and which have comparable softening points.

EXAMPLE 14

A diglycidyl ether of Bisphenol A having an EEW of 189 (900.0 g, 4.76 epoxide equiv.) and Bisphenol A (308.5 g, 2.71 phenolic OH equiv.) are mixed and allowed to react as in Example 1. After complete reaction of the liquid resin and Bisphenol A, 42.8 g (3.4 weight %) succinimide is added to the molten resin with stirring at 170° C. A slight exothermic reaction occurs. After the reaction mixture temperature returns to 170° C., the mixture is allowed to stir at this temperature for ~15 minutes, and allowed to cool to room temperature. A pale yellow, transparent resin results which has an EEW of 783, Mettler softening point of 93.6° C. and a melt viscosity (150° C., Kinematic) of 1671 centistokes. The resin. before succinimide addition, has an EEW of 583 and a Mettler softening point of 81° C.

EXAMPLE 15

Example 15 is prepared in a manner similar to Example 14 except that 450.0 g (2.38 epoxide equiv.) of the diglycidyl ether of Bisphenol A and 154.3 g (1.35 phenolic OH equiv.) of Bisphenol A are used and Tetrahydrophthalimide (32.5 g, 5.1 weight %) is used in place of succinimide. The resulting pale yellow, transparent resin has an EEW of 808, Mettler softening point of 93.9° C., and a melt viscosity (150° C., Kinematic) of 1767 centistokes. The resin before reaction with tetrahydrophthalimide has an EEW of 650 and a Mettler softening point of 85° C.

EXAMPLE 16

A powder coating is prepared from the resin prepared in Example 12. Example 12 resin (23.4 weight %), Scado P2610 (35.1 weight %, a carboxy functional polyester resin), Titanium dioxide (40.0 weight %), Benzoin (0.7 weight %), and Acrylron ™ MFP (0.8 weight %, a flow modifier) are weighed out and ry blended. The mixture is then melt mixed using a Buss Condux PLK 46 single screw extruder, operated at 120 rpm with Zone 1 set at 70° C. and Zone 2 set at 110° C. The extrudate is passed through BCI Chill Rolls, cooled, and crushed. The crushed extrudate is then ground into a fine powder using a Brinkman Centrifugal Grinding Mill utilizing the 24 tooth grinding attachment and classified by sieving through No. 140 (150 mesh) standard sieves (wire cloth). The powder coating is then applied via electrostatic spray with a Gema Ag Type 710 Laboratory Unit (set at 60–70 kV) on the 4"×12"×20 gauge (101.6 mm×304.8 mm×0.9 mm) cold rolled steel, clean treatment, Parker test panels. The powder coated panels are then cured at 180° C. for 30 minutes in a Blue M Touchmatic convection oven. After removal from the oven, the panels are allowed to cool and the coating properties are evaluated. The resulting powder coating has equivalent coating properties with superior smoothness as compared to a similar powder coating made from standard epoxy resin (See Comparative Experiment E). Coating evaluation data is found in Table II.

EXAMPLE 17

A powder coating is prepared using the method described in Example 16 with the following change in ingredients. Example 12 resin (19.4 weight %), Scado P2610 (29.1 weight %), Titanium dioxide (50 weight %), Benzoin (0.7 weight %), Acrylron MFP (0.8 weight %). The coating resulting from this powder has good physical properties and an appearance equivalent to a similar powder coating made from standard epoxy resin. Coating evaluation data is found in Table II.

EXAMPLE 18

A powder coating is prepared using the method described in Example 16 with the following change in ingredients. Example 12 resin (15.4 weight %), Scado P2610 (23.1 weight %), Titanium dioxide (60 weight %), Benzoin (0.7 weight %), Acrylron MFP (0.8 weight %). Coating evaluation data is found in Table II.

COMPARATIVE EXPERIMENT E (Not an Example of the Present Invention)

A powder coating is prepared using the method described in Example 16 with the following change in ingredients. A diglycidyl ether of bisphenol A having an EEW of 700 commercially available from The Dow Chemical Company as D.E.R. ™ 662UH (23.4 weight %), Scado P2610 (35.1 weight %), Titanium dioxide (40 weight %), Benzoin 0.7 weight %), Acrylron MFP (0.8 weight %). Coating evaluation data for this powder coating is found in Table II.

EXAMPLE 19

A powder coating is prepared by first melting Example 12 resin and then mixing in 2 weight % BYK 361 (a flow modifier). Once thoroughly mixed, the molten resin is allowed to cool and then formulated using the method described in Example 16. The amounts of the ingredients are as follows: Example 12 resin containing BYK 361 (23.7 weight %), Scado P2610 (35.6 weight %), Titanium dioxide (40 weight %), Benzoin (0.7 weight %). The coating prepared from this powder has superior smoothness as compared to a similar powder prepared from standard epoxy resin which contains 2 weight % BYK 361 (see Comparative Experiment F). Coating evaluation data for this powder coating is found in Table II.

COMPARATIVE EXPERIMENT F (Not an Example of the Present Invention)

A powder coating is prepared by first melting a diglycidyl ether of bisphenol A having an EEW of 700 commercially available from The Dow Chemical Company as D.E.R. ™ 662UH and then mixing in 2 weight % BYK 361. Once thoroughly mixed, the molten resin is allowed to cool and then formulated using the method described in Example 16. Coating evaluation data for this powder coating is found in Table II.

TABLE II

| TEST | EXAMPLE OR COMPARATIVE EXPERIMENT | | | | | |
|---|---|---|---|---|---|---|
| | 16 | 17 | 18 | E* | 19 | F* |
| Impact (F/R)$^a$ | 160/160 | 100/50 | 80/35 | 160/160 | 140/130 | 160/160 |
| Gloss (20°/60°) | 82/93 | 63/88 | 2/10 | 70/92 | 86/95 | 83/94 |
| Cross Hatch Adhesion (% Loss) | <5 | <5 | <5 | <5 | <5 | <5 |
| MEK Db Rbs$^b$ | 3 | 3 | 3 | 5 | 3 | 5 |
| Pill Flow (mm)$^c$ | 70 | 41 | 22 | 50 | 75 | 52 |
| YI$_i$ (Initial)$^d$ | .07 | −.05 | −.04 | −.02 | .8 | .3 |
| YI$_{OB}$ (30 min. OB)$^e$ | .38 | −.01 | .1 | −.02 | 1.2 | .8 |
| Gel Time (sec)$^f$ | 223 | 243 | 292 | 160 | 196 | 162 |
| Pencil Hardness | F | F | 5H | F | F | F |

*Not an example of the present invention.
$^a$Forward and reverse impact.
$^b$Methyl ethyl ketone double rubs.
$^c$0.75 g pill (6 mm × 12 mm diameter) inclined at 60° in a 300° F. oven for 15 minutes.
$^d$Yellowness index, initial reading.
$^e$Yellowness index reading after 30 minute overbake at 180° C.
$^f$Gel time at 180° C.

EXAMPLE 20

A solid diglycidyl ether of bisphenol A having an EEW of 535, a melt viscosity at 150° C. of 920 cSt and a Mettler softening point of 78° C. is reacted with 5 wt.% phthalimide at 170° C. for 2 hours. The resultant modified, solid epoxy resin has a Mettler softening point of 88° C.

EXAMPLE 21

A solid glycidyl ether of bisphenol A having an EEW of 671, a melt viscosity of 1813 cSt at 150° C., and a Mettler softening point of 93° C. is reacted with 1.0 wt.% phthalimide at 170° C. for 50 minutes. The resultant modified, solid epoxy resin has Mettler softening point of 96° C.

Three typical solid epoxy resin (Comparative Experiments G-I) and two resins of this invention (Examples 20 and 21) are evaluated using the accelerated storage stability test method described below. The results of this study are shown in Table III in which the time required for each sample to sinter is shown. Three of these resins are commercially available solid epoxy resins available from The Dow Chemical Company, as D.E.R. ™ 661 epoxy resin (Comparative Experiment G), D.E.R. ™ 662 epoxy resin (Comparative Experiment H), and D.E.R. ™ 662UH epoxy resin (Comparative Experiment I). These resins are in the form of solid chips or flakes ranging in size from about 0.25 to about 3 cm in diameter. Comparative Experiment G, has a Mettler softening point of about 79° C., is known to cake or sinter during prolonged periods of storage at ambient storage temperatures which can range from about 60° F. to about 125° F. At higher storage temperatures, physical storage stability is reduced and the resin chips cake quickly. The resin of Comparative Experiment G is considered to be insufficient physically storage stable. The resin of Comparative Experiment H has a Mettler softening point of about 85° C., is considered to be only marginally storage stable and will cake or sinter at temperatures in the mid to high range of those typically found in a warehouse. Thus, it is not considered to be physically storage stable under most typical storage conditions. The resin of Comparative Experiment I has a Mettler softening point of about 94° C. and is known to be more physically storage stable under warehousing conditions.

ACCELERATED STORAGE STABILITY TEST

The epoxy resins are ground and sieved through and 80 mesh screen (180 micron or less). The powdered resins (25.0 g each) are then sealed in clear, 2 oz. glass bottles and placed in a 40° C. water bath so that the water level is above the level of the powder but not above the top of the bottles. The water temperature is maintained at 40° C. for three days and then raised 3° C. every three days until all of the powders have sintered. To determine the time required to sinter, the samples are removed from the bath on a regular basis (every several hours for the first day at each temperature), dried and allowed to cool for several minutes. The bottles are agitated lightly and the fluidity of the powder noted. If the samples no longer are free flowing, the bottle caps are removed and the samples are examined by lightly prodding them with a spatula. The samples are considered to be completely sintered when light prodding could no longer brake down the powder mass. The time required to reach this point is then recorded.

TABLE III

| EXAMPLE OR COMPARATIVE EXPERIMENT | METTLER SOFTENING POINT (°C.) | TIME TO SINTER (hours) | MELT VISCOSITY$^a$ (cSt) |
|---|---|---|---|
| G* | 79 | 3 | 600 |
| H* | 85 | 32 | 1000 |
| I* | 94 | 216 | 2200 |
| 20 | 88 | 170 | 920 |
| 21 | 96 | 336 | 2260 |

*Not an example of the present invention.
$^a$Measured at 150° C.

The resin of Example 20 remains a non-sintered, flowable powder for more than five times longer than the marginally storage stable resin of Comparative Experiment H as indicated in Table III. The resin of Example 20 and Comparative Experiment H have comparable Mettler softening points, 88° C. and 85° C. respectively. The resin of Example 21, having a softening point and melt viscosity comparable to Comparative Experiment I, remained a non-sintered, free flowing powder for 120 hours longer than the resin of Comparative Experiment I.

What is claimed is:

1. A modified, solid epoxy resin which is capable of being further cured with an epoxy resin curing agent having a Mettler softening point of at least about 85° C. resulting from reacting a solid epoxy resin having an average of more than one vicinal epoxide group per molecule with a monoimide of a dicarboxylic acid which is essentially free of carboxyl, allyl and methallyl groups in an amount sufficient to raise the Mettler softening point to at least 85° C. when the resin before modification has a Mettler softening point below 85° C.; or when the softening point of the unmodified resin is above 85° C., an amount sufficient to raise the softening point by at least about 2° C.

2. A modified, solid epoxy resin of claim 1 wherein said solid epoxy resin prior to modification is one which has been prepared by reacting (A) an epoxy resin represented by the following Formulas I, II, III or IV or any combination thereof

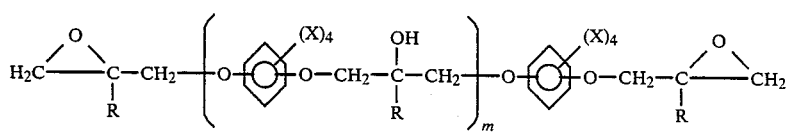
FORMULA I

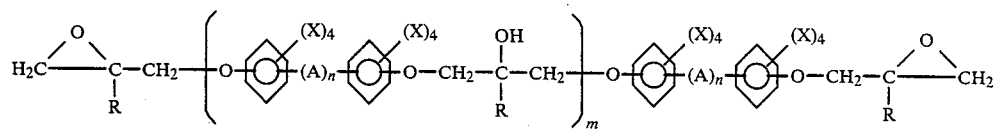
FORMULA II

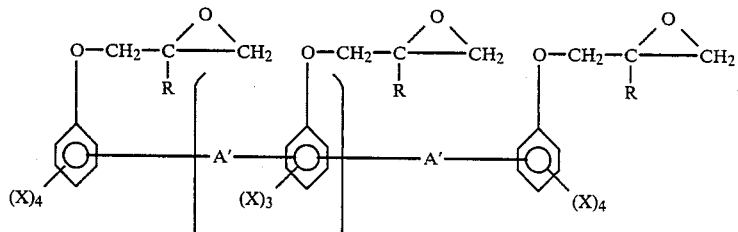
FORMULA III

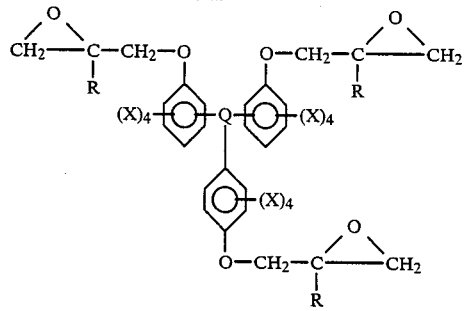
FORMULA IV wherein each A is independently a divalent hydrocarbon group having from 1 to about 10 carbon atoms, $-O-$, $-S-$, $-S-S-$, $-SO-$, $-SO_2-$ or $-CO-$; Q is a trivalent hydrocarbon group having from 1 to about 10 carbon atoms; each A' is independently a divalent hydrocarbon group having from 1 to about 10 carbon atoms; each R is independently hydrogen or an alkyl group having from 1 to about 4 carbon atoms; each X is independently hydrogen, a hydrocarbyl or hydrocarbyloxy group having from 1 to about 10 carbon atoms, bromine, chlorine or fluorine; m has an average value of from greater than zero to about 15; m' has an average value from about 0.001 to about 5; and n has a value of zero or 1; with (B) an organic compound having an average of about 2 aromatic hydroxyl groups per molecule represented by the following formulas (V) or (VI) or any combination thereof

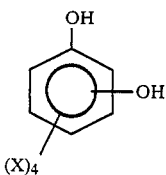
FORMULA V

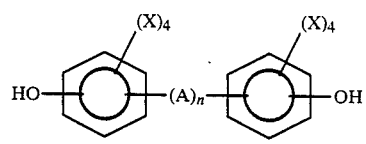
FORMULA VI wherein each A and X is as defined above; and wherein components (A) and (B) are employed in quantities which provide a ratio of phenolic hydroxyl groups to epoxy groups of from about 0.1:1 to about 0.9:1.

3. A modified, solid epoxy resin of claim 2 wherein each A is a divalent hydrocarbon group having from 1 to about 6 carbon atoms; each A' is a hydrocarbon group having from 1 to about 4 carbon atoms; Q has 1 carbon atom; each R is hydrogen; each X is hydrogen, methyl or bromine; m has an average value from 0.001 to about 1; m' has an average value from about 0.001 to about 3; n has a value of 1; and wherein components (A) and (B) are employed in quantities which provide a ratio of phenolic hydroxyl groups to epoxy groups of from about 0.3:1 to about 0.7:1.

4. A modified, solid epoxy resin of claim 3 wherein component (A) is a diglycidyl ether of bisphenol A; component (B) is bisphenol A; and components (A) and (B) are employed in quantities which provide a ratio of phenolic hydroxyl groups to epoxy groups of from about 0.4:1 to about 0.7:1.

5. A modified, solid epoxy resin of claim 2 wherein said epoxy resin is an epoxy resin represented by formulas I or II or a combination thereof wherein each A is independently a divalent hydrocarbon group having from 1 to about 10 carbon atoms, —O—, —S—, —S—S—, —SO—, —SO$_2$— or —CO—; each R is independently hydrogen or an alkyl group having from 1 to about 4 carbon atoms; each X is independently hydrogen, a hydrocarbyl or hydrocarbyloxy group having from 1 to about 10 carbon atoms, bromine, chlorine or fluorine; m has an average value of from about 2 to about 15; and n has a value of zero or 1.

6. A modified, solid epoxy resin of claim 5 wherein each A is independently a divalent hydrocarbon group having from 1 to about 6 carbon atoms; each X is independently hydrogen, methyl or bromine; m has an average value of from about 2 to about 10; and n has a value of 1.

7. A modified, solid epoxy resin of claim 6 wherein said epoxy resin is represented by Formula II wherein A is an isopropylidine group; each X is hydrogen; and m has an average value of from about 3 to about 6.

8. A modified, solid epoxy resin of claim 1, 2, 3, 4, 5, 6, or 7 wherein the amount of monoimide employed is from about 0.5 to about 10 percent by weight based on the weight of the epoxy resin and the monoimide is one or more of those represented by the following formula VII

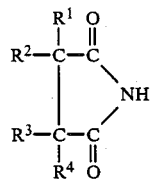

FORMULA VII wherein each $R^1$, $R^2$, $R^3$, $R^4$, is independently hydrogen or a hydrocarbyl group having from 1 to about 20 carbon atoms or $R^2$ and $R^3$ can be combined to form a saturated or unsaturated cycloaliphatic ring or an aromatic ring.

9. A modified epoxy resin of claim 8 wherein the amount of monoimide employed is from about 1 to about 6 percent by weight based on the weight of the epoxy resin and the monoimide and in formula VII, each $R^1$, $R^2$, $R^3$, $R^4$, is independently hydrogen or a hydrocarbyl group having from 1 to about 10 carbon atoms or $R^2$ and $R^3$ can be combined to form a saturated or unsaturated cycloaliphatic ring or an aromatic ring.

10. A modified, solid epoxy resin of claim 9 wherein the monoimide is phthalimide, succinimide, tetrahydrophthalimide, 2,3-naphthalenedicarboximide, pentanedicarboximide, hexanedicarboximide, 3-methyl-1,2-benzene-dicarboximide, 1,2-cyclohexanedicarboximide, 1,2-cyclopentanedicarboximide, 3-methyl-1,2-cyclopentane-dicarboximide, 3-methylazacyclopentane-2,5-dione, or any combination thereof and is employed in an amount of from about 2 to about 5 percent by weight based upon the combined weight of monoimide compound and epoxy resin.

11. A modified, solid epoxy resin of claim 9 wherein the monoimide is phthalimide, succinimide, tetrahydrophthalimide, or any combination thereof.

12. A curable composition which comprises (A) at least one modified, solid epoxy resin of claim 1, 2, 3, 4, 5, 6 or 7; and (B) a curing quantity of at least one curing agent for component (A).

13. A curable composition of claim 12 wherein said curing agent is a primary aliphatic polyamine, a secondary aliphatic polyamine, tertiary amine, carboxylic acid or carboxylic acid anhydride, phenolic hydroxyl-containing compound, guanidine, biguanide, urea-aldehyde resin, melamine-aldehyde resin, aromatic polyamine, sulfanilamide, phosphate acid, phosphate ester, phosphite, Lewis acid or a combination thereof.

14. A curable composition which comprises (A) at least one modified, solid epoxy resin of claim 8; and (B) a curing quantity of at least one curing agent for component (A).

15. A curable composition of claim 14 wherein said curing agent is selected from biguanides, guanidines, imidazoles, ethylene-acrylic acid copolymers, ethylene-methacrylic acid copolymers, styrene-acrylic acid copolymers, styrene-methacrylic acid copolymers, polyisocyanates, and combinations thereof.

16. A curable composition of claim 14 wherein said curing agent is dicyandiamide, methylenedianiline, diaminodiphenylsulfone, a phenol-formaldehyde novolac resin, a cresol-formaldehyde novolac resin, 2-methylimidazole, 2-phenylimidazole, trimellitic anhydride, pyromellitic anhydride, phthalic anhydride, maleic anhydride, succinic anhydride, or a combination thereof.

17. A curable composition which comprises (A) at least one modified, solid epoxy resin of claim 9; and (B) a curing quantity of at least one curing agent for component (A).

18. A curable composition of claim 17 wherein said curing agent is a carboxyl functional polyester resin.

19. A curable composition which comprises (A) at least one modified, solid epoxy resin of claim 10; and (B) a curing quantity of at least one curing agent for component (A).

20. A curable composition of claim 19 wherein said curing agent is a carboxyl functional polyester resin.

21. A coating composition comprising the curable composition of claim 12 and at least one additive selected from the group consisting of solvents or diluents, fillers, pigments, dyes, flow modifiers, thickeners, leveling agents, extenders, reinforcing agents, antistatic agents, curing agents, catalysts or fluidizing agents.

22. A coating composition comprising the curable composition of claim 13 and at least one additive selected from the group consisting of solvents or diluents, fillers, pigments, dyes, flow modifiers, thickeners, leveling agents, extenders, reinforcing agents, antistatic agents, curing agents, catalysts or fluidizing agents.

23. A coating composition comprising the curable composition of claim 14 and at least one additive selected from the group consisting of solvents or diluents, fillers, pigments, dyes, flow modifiers, thickeners, leveling agents, extenders, reinforcing agents, antistatic agents, curing agents, catalysts or fluidizing agents.

24. A coating composition comprising the curable composition of claim 15 and at least one additive selected from the group consisting of solvents or diluents, fillers, pigments, dyes, flow modifiers, thickeners, leveling agents, extenders, reinforcing agents, antistatic agents, curing agents, catalysts or fluidizing aids.

25. A coating composition comprising the curable composition of claim 16 and at least one additive selected from the group consisting of solvents or diluents, fillers, pigments, dyes, flow modifiers, thickeners, leveling agents, extenders, reinforcing agents, antistatic agents, curing agents, catalysts or fluidizing aids.

26. A coating composition comprising the curable composition of claim 17 and at least one additive selected from the group consisting of solvents or diluents, fillers, pigments, dyes, flow modifiers, thickeners, leveling agents, extenders, reinforcing agents, antistatic agents, curing agents, catalysts or fluidizing aids.

27. A coating composition comprising the curable composition of claim 18 and at least one additive selected from the group consisting of solvents or diluents, fillers, pigments, dyes, flow modifiers, thickeners, leveling agents, extenders, reinforcing agents, antistatic agents, curing agents, catalysts or fluidizing aids.

28. A coating composition comprising the curable composition of claim 19 and at least one additive selected from the group consisting of solvents or diluents, fillers, pigments, dyes, flow modifiers, thickeners, leveling agents, extenders, reinforcing agents, antistatic agents, curing agents, catalysts or fluidizing aids.

29. A coating composition comprising the curable composition of claim 20 and at least one additive selected from the group consisting of solvents or diluents, fillers, pigments, dyes, flow modifiers, thickeners, leveling agents, extenders, reinforcing agents, antistatic agents, curing agents, catalysts or fluidizing aids.

* * * * *